United States Patent
Yasui et al.

[11] Patent Number: 5,161,229
[45] Date of Patent: Nov. 3, 1992

[54] CENTRAL PROCESSING UNIT

[75] Inventors: Takashi Yasui, Toyonaka; Keiichi Yoshioka, Sanda; Shinichi Yamaura, Takarazuka, all of Japan

[73] Assignee: Ricoh Company, Ltd., Tokyo, Japan

[21] Appl. No.: 533,383

[22] Filed: Jun. 5, 1990

[30] Foreign Application Priority Data

Jun. 9, 1989 [JP] Japan ................ 1-148064

[51] Int. Cl.$^5$ .............. G06F 9/30; G06F 9/302; G06F 9/46
[52] U.S. Cl. .................. 395/775; 364/DIG. 1; 364/259.9; 364/263.2; 364/258; 364/230.2
[58] Field of Search ............ 364/900, 230.2, 942.8, 364/200, DIG. 1, DIG.2; 395/725, 775

[56] References Cited

U.S. PATENT DOCUMENTS

| | | | |
|---|---|---|---|
| 4,001,783 | 1/1977 | Monahan et al. | 364/200 |
| 4,003,028 | 6/1977 | Bennett et al. | 364/200 |
| 4,037,204 | 7/1977 | Bennett et al. | 364/200 |
| 4,128,739 | 8/1980 | Negi et al. | 395/725 |
| 4,160,289 | 7/1970 | Bambara et al. | 364/200 |
| 4,422,141 | 12/1983 | Shoji | 364/200 |
| 4,517,643 | 5/1988 | Bannai | 364/200 |
| 4,912,628 | 3/1990 | Briggs | 364/200 |
| 4,969,119 | 11/1990 | Kurokawa et al. | 395/775 |
| 4,975,839 | 12/1990 | Nakatsuka et al. | 364/200 |
| 4,998,197 | 5/1991 | Kurakazu et al. | 364/200 |

Primary Examiner—Michael R. Fleming
Assistant Examiner—Ayaz R. Sheikh
Attorney, Agent, or Firm—Cooper & Dunham

[57] ABSTRACT

A central processing unit has a plurality of control sections; a device for selectively operating and unoperating the control sections by an external interrruption signal; and a device for processing an interruption sequence with respect to the interruption signal by the operations of the control sections in a state in which the control sections are operated. The control processing unit may be constructed such that the control sections are composed of two control sections and one of the two control sections processes a normal instruction sequence and is unoperated by the interruption signal, and the other of the two control sections is operated at the times of the normal instruction and interruption and processes the interruption sequence in addition to the normal instruction.

2 Claims, 4 Drawing Sheets

1

CENTRAL PROCESSING UNIT

BACKGROUND OF THE INVENTION

1. Field of the Invention

The present invention relates to a central processing unit for performing an interruption processing at a high speed.

2. Description of the Related Art

In a central processing unit, a specific processing sequence is generally executed by an external signal. Interruption or exception processing is an example of a specific processing sequence. There are several kinds of interruption or exception processings. There are external interruptions (hardware interruptions) such as reset, maskable interrupt (IRQ), non maskable interrupt (NMI), bus error interrupt, etc. There are also internal interruptions such as a software interrupt.

U.S. Pat. No. 4,037,204 shows a method for generating a specific code in an instruction register at the time of an external interruption. In this method, it is possible to commonly perform the interruption processing by generating an interruption signal having the same code for a hardware interruption for a software interruption.

However, the respective interruption processings are different from each other and all addresses for storing interruption vectors are also different from each other. When a sequence of these interruptions is processed and the hardware and software interruptions hardware and software are performed by the common code mentioned above, the interruption processing is limited by the processing flow requiring the a longest processing time and a useless cycle (dummy cell) is disposed in the processing requiring a processing time shorter than the longest processing time, thereby reducing processing speed. Further, when there is no software interruption or a specific code different from that in the software interruption is assigned in an instruction system, this code cannot be used in the instruction system so that the instruction code is useless.

SUMMARY OF THE INVENTION

It is therefore an object of the present invention to provide a central processing unit for performing an interruption processing at a high speed by executing a predetermined interruption sequence every interruption factor.

The above object of the present invention can be achieved by a central processing unit comprising a plurality of control sections; means for selectively operating and unoperating the control sections by an external interruption signal; and means for processing an interruption sequence with respect to the interruption signal by the operations of the control sections in a state in which the control sections are operated.

In accordance with the above construction of the central processing unit, individual instruction decoders are provided with respect to a normal instruction processing and an external interruption processing. Thus, individual instruction codes are generated with respect to the normal instruction processing and the external interruption processing. Therefore, allocation of a instruction code with respect to the normal instruction decoder can efficiently be made by processing the normal instruction processings and the external interruption processings in each instruction code. And since an optimum processing sequence can be formed for the external interruption processing, the processing can also be performed at a high speed.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a central processing unit in the present invention will next be described in detail with reference to the accompanying drawings.

Figure 1:
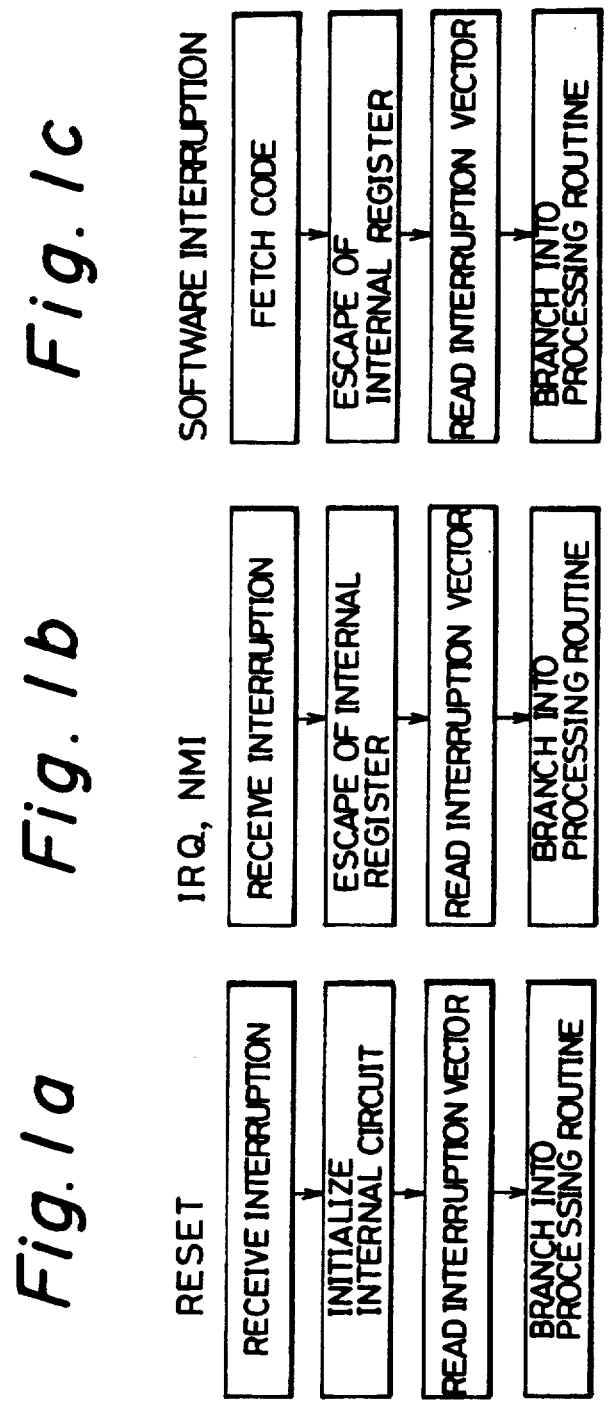
FIGS. 1a to 1c are flow charts showing cycles of various kinds of instructions.

As shown in FIGS. 1a to 1c, respective interruption processings are different from each other and all addresses for storing interruption vectors are also different from each other. When a sequence of these interruptions is processed and the hardware and software interruptions are performed by a common code, the interruption processing is limited by a processing flow requiring a longest processing time and a useless cycle (dummy cell) is disposed in a processing requiring the processing time shorter than the longest processing time, thereby reducing processing speed.

Figure 2:
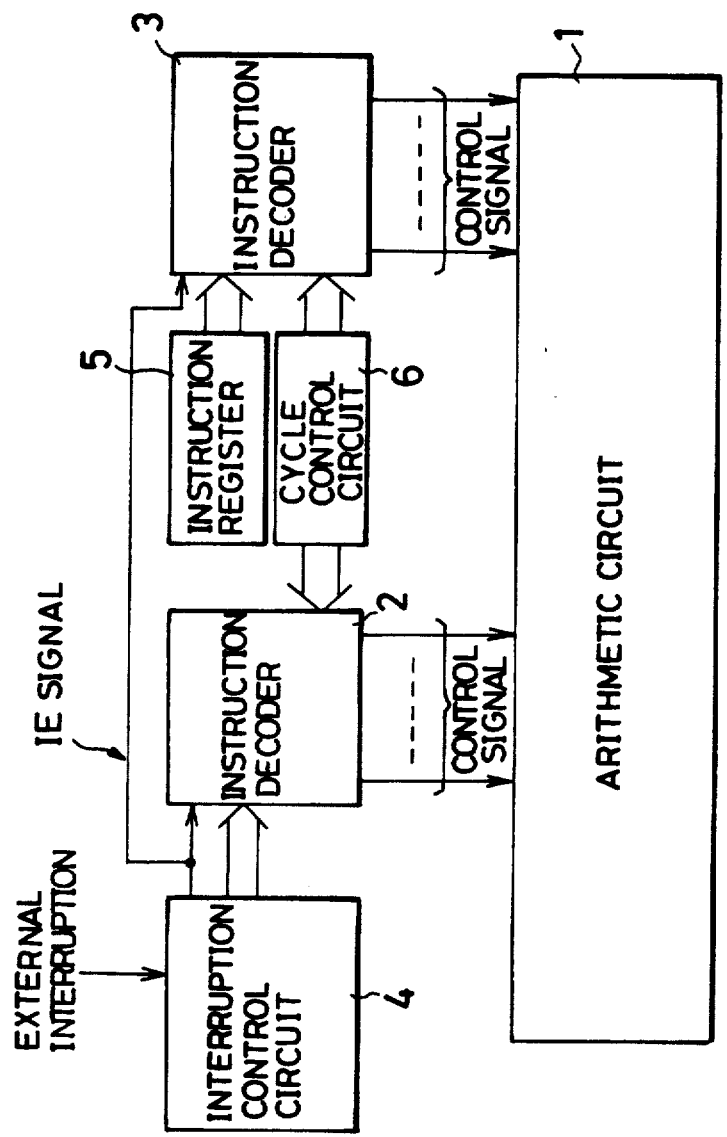
FIG. 2 is a block diagram showing the construction of a central processing unit in one embodiment of the present invention.

FIG. 2 is a block diagram showing the construction of a central processing unit in one embodiment of the present invention.

In FIG. 2, two instruction decoders 2 and 3 are connected to an arithmetic circuit 1 for performing various kinds of arithmetic processings and construct a control section for this arithmetic circuit 1. These instruction decoders 2 and 3 are selectively operated or unoperated by an IE signal provided from an interruption control circuit 4. An instruction register 5 and a cycle control circuit 6 transmit an instruction code information signal and a control clock signal to the instruction decoders 2 and 3.

The operation of the central processing unit constructed as above will next be described.

When an external interruption signal is inputted to the interruption control circuit 4 and the interruption control circuit 4 receives this signal, the interruption control circuit 4 outputs an IE signal. The instruction decoder 3 receives this IE signal and is then disabled so that a control signal from this instruction decoder 3 is in a disabled state.

The instruction decoder 2 decodes to a control signal required for a predetermined processing sequence with respect to the external interruption on the basis of a group of signals including the IE signal from the interruption control circuit 4. The instruction decoder 2 then supplies this decoded signal to the arithmetic circuit 1. When the above interruption processing sequence is completed by the arithmetic circuit 1, the above IE signal is ineffective, the operating state of the instruction decoder 2 is returned to a disabled state and the operating state of the instruction decoder 3 is returned to a normal instruction processing state. Thus, the instruction decoder 3 processes the normal instruction.

Figure 3:
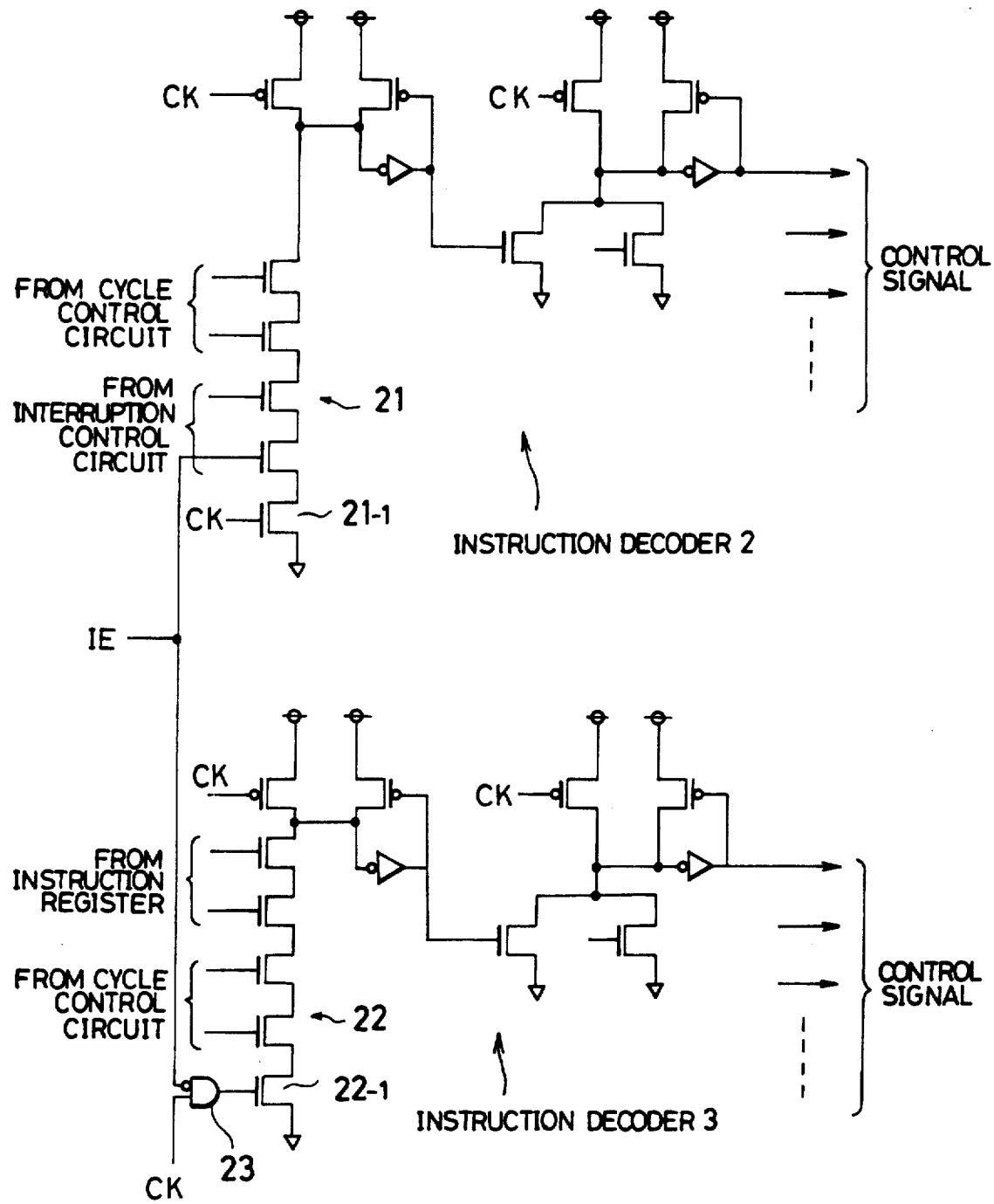
FIG. 3 is a circuit diagram of an instruction decoder in the central processing unit in FIG. 2.

The above instruction decoders 2 and 3 can be constructed by a microprogram, hard wiring, etc., but can also be constructed by a programmable logic array (PLA) using a clock signal as shown in FIG. 3.

In FIG. 3, the IE signal is inputted to the instruction decoder 2 as it is as a clock signal CK for Nch transistors 21-1 and 22-1 located in the lowermost positions of AND sections 21 and 22 in the instruction decoders 2 and 3. A logic product of an inverted signal of the AND IE signal and the clock signal CK is inputted to the instruction decoder 3 by the operation of an AND circuit 23. When the IE signal is an an enable state, the instruction decoder 3 is disabled and the instruction decoder 2 is operated. In this circuit construction, the AND and OR sections of two programmable logic arrays are independently described. However, since the IE signal is inputted to only the AND section, the OR section may be commonly used if only the AND section is independently disposed. Accordingly, the programmable logic array having an independent AND section can be considered as an independent programmable logic array.

Figure 4:
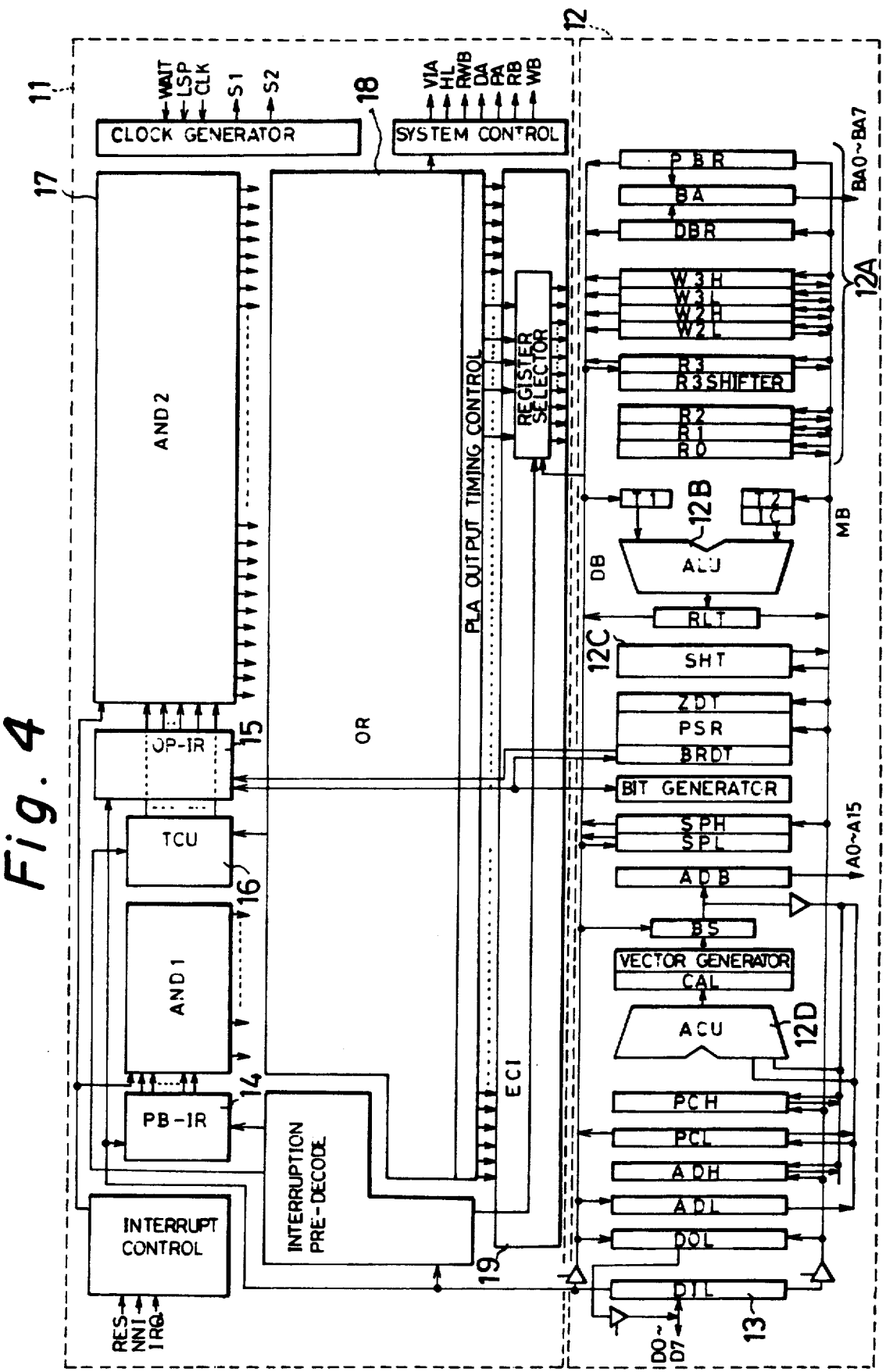
FIG. 4 is a circuit diagram showing an example of the detailed construction of the central processing unit in FIG. 2.

FIG. 4 shows an example of the real circuit construction of the central processing unit shown in FIG. 2.

In FIG. 4, this central processing unit can be generally divided into an instruction control section 11 and an arithmetic section 12.

In the execution of an instruction, an instruction code is supplied to a data input latch (DIL in FIG. 4) 13 through external data buses D0 to D7. This instruction code is stored to a pre-byte instruction register (PB-IR in FIG. 4) 14 or an instruction register (OP-IR) 15 and is held until the next instruction is generated. Outputs of these instruction registers and an output of a timing control unit (TCU in FIG. 4) 16 for controlling the timing of the instruction sequence are supplied to an instruction decoding circuit composed of a part of AND1, AND2 and an OR circuit 18. A control signal for controlling the operation of the arithmetic section 12 is generated by a signal transmitted from the instruction decoding circuit through an execution control interface (ECI in FIG. 4) 19.

As regards the interruption processing, only the residual part of AND1 and the OR circuit are effective by the IE signal supplied from the interrupt control circuit, the signal from the interrupt control circuit is decoded and transmitted to ECI, and the control signal is generated.

The arithmetic section 12 performs an arithmetic processing therein in accordance with this control signal and receives and transmits data to the exterior thereof. The arithmetic section 12 includes a register group 12A, an ALU 12B, a shifter 12C and an address computing unit (ACU in FIG. 4) 12D.

In an embodiment in FIG. 4, AND1 is to be operated in spite of the presence of the external interruption, but AND1 is respectively separated into a part of unoperated.enable state and another part of enable.unoperated state, therefore AND1 is substantially operated such as shown in FIG. 2.

As mentioned above, the central processing unit in the present invention is provided with individual instruction decoders with respect to the normal instruction processing and the external interruption processing, and the normal instruction processings and the external interruption processings are processed by means of each instruction decoder. Therefore, allocation of the instruction with respect to the normal instruction processing can be efficiently made. Furthermore, no additional dummy cycle is disposed, and the instruction processing can be performed at a high speed.

And since the optimum processing sequence can be formed for the external interruption processing, the processing can also be performed at a high speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A central processing unit comprising:
   an arithmetic circuit for performing an arithmetic processing;
   an interruption control circuit for outputting an interruption control signal for an interruption processing on the basis of an external interruption signal inputted thereto;
   a first control means connected to said interruption control circuit and said arithmetic circuit for controlling operations of said arithmetic circuit so as to cause said arithmetic circuit to perform the arithmetic processing when said first control means does not receive the interruption control signal from said interruption control circuit and to prevent a performing of the arithmetic processing when said first control means receives the interruption control signal from said interruption control circuit; and
   a second control means connected to said interruption control circuit and said arithmetic circuit for controlling operations of said arithmetic circuit so as to cause said arithmetic circuit to perform the interruption processing when said second control means receives the interruption control signal from said interruption control circuit and to prevent a performing of the interruption processing when said second control means does not receive the interruption control signal from said interruption control circuit.

2. A central processing unit according to claim 1, in which said first control means and said second control means each include respective decoders.

* * * * *